United States Patent [19]

Ensley

[11] Patent Number: 5,365,186
[45] Date of Patent: Nov. 15, 1994

[54] PROTON MASER

[76] Inventor: Donald L. Ensley, P.O. Box 955, Bodega Bay, Calif. 94923

[21] Appl. No.: 18,048

[22] Filed: Feb. 16, 1993

[51] Int. Cl.$^5$ .............................................. H01S 1/02
[52] U.S. Cl. ....................................... 330/4; 331/94.1
[58] Field of Search ............................ 330/4; 331/94.1

[56] References Cited

U.S. PATENT DOCUMENTS

| 3,725,798 | 4/1973 | Webster et al. | 330/4 |
| 4,290,848 | 9/1981 | Sudan | 176/5 |
| 4,370,621 | 1/1983 | Sprangle et al. | 330/4 |
| 4,894,199 | 1/1990 | Rostoker | 376/107 |

OTHER PUBLICATIONS

Walsh et al. Proc. SPIE–Int. Soc. Opt. Eng. (USA), vol. 1061, pp. 60–67, 1989; abst. only applied.
Mostrom et al; Proc. SPIE as in R above, Int pp. 68–75; abstract only applied herewith.
Lemlie, R. W.,; 1990 IEEE Conf. on Plasma Science, May 23, 1990; abstract only enclosed herewith.
Ensley, "Proton Maser Gain", *The American Physical Society*, vol. 39, No. 3, pp. 958–962 (Feb. 1, 1989).
Ensley, "Proton Maser", *Microwave and Particle Beam Sources and Propagation*, vol. 873, pp. 117–124 (1989).
Marcuse, Engineering Quantum Electrodynamics, Chapter 4, Harcourt, Barce & World, Inc. (1970).

*Primary Examiner*—Nelson Moskowitz
*Attorney, Agent, or Firm*—Arnold, White & Durkee

[57] ABSTRACT

A method of generating microwave power by producing a charged-particle beam that is charge-neutralized by electrons. The charged particles are heavier than electrons. The charge-neutralized beam is passed through at least one conductive cavity which is resonant at a desired microwave frequency and in a desired fundamental mode. A microwave beam is extracted from said resonant cavity.

10 Claims, 12 Drawing Sheets

PROTON MASER

FIELD OF THE INVENTION

The present invention relates generally to microwave power generation and, more particularly, to the generation of microwave power from a proton beam. Devices for producing microwave power from either electron or proton beams are sometimes referred to in the literature as masers, which is an acronym for microwave amplification by stimulated emission of radiation.

SUMMARY OF THE INVENTION

It is a primary object of the present invention to provide a proton maser which can be driven at relatively high power levels.

It is another object of this invention to provide a proton maser which capable of operating at efficiencies greater than 50% and gains greater than 40% per cycle.

A further object of this invention is to provide a proton maser which is capable of saturated operation in less than 30 nanoseconds.

Yet another object of this invention is to provide a proton maser which is capable of producing intense microwave beams.

Other objects and advantages of the invention will be apparent from following detailed description and the accompanying claims.

In accordance with the present invention, the foregoing objectives are realized by providing a system for generating microwave power by producing a charged-particle beam that is charge-neutralized by electrons, passing the charged-particle beam through at least one conductive cavity which is resonant at a desired microwave frequency and in a desired fundamental mode, and extracting a microwave beam from the resonant cavity. In preferred embodiments of the invention, a magnetic field is generated around a proton beam to prevent the electrons in the proton beam from loading the resonant cavity; the proton beam is passed through at least two of the resonant cavities spaced along the path of the proton beam; and the proton beam is terminated by intercepting the beam with a conductive surface that intersects the beam axis at an acute angle and that is made of a material which is capable of absorbing the remaining beam energy without vaporizing.

DETAILED DESCRIPTION OF THE PREFERRED EMBODIMENTS

Figure 1:
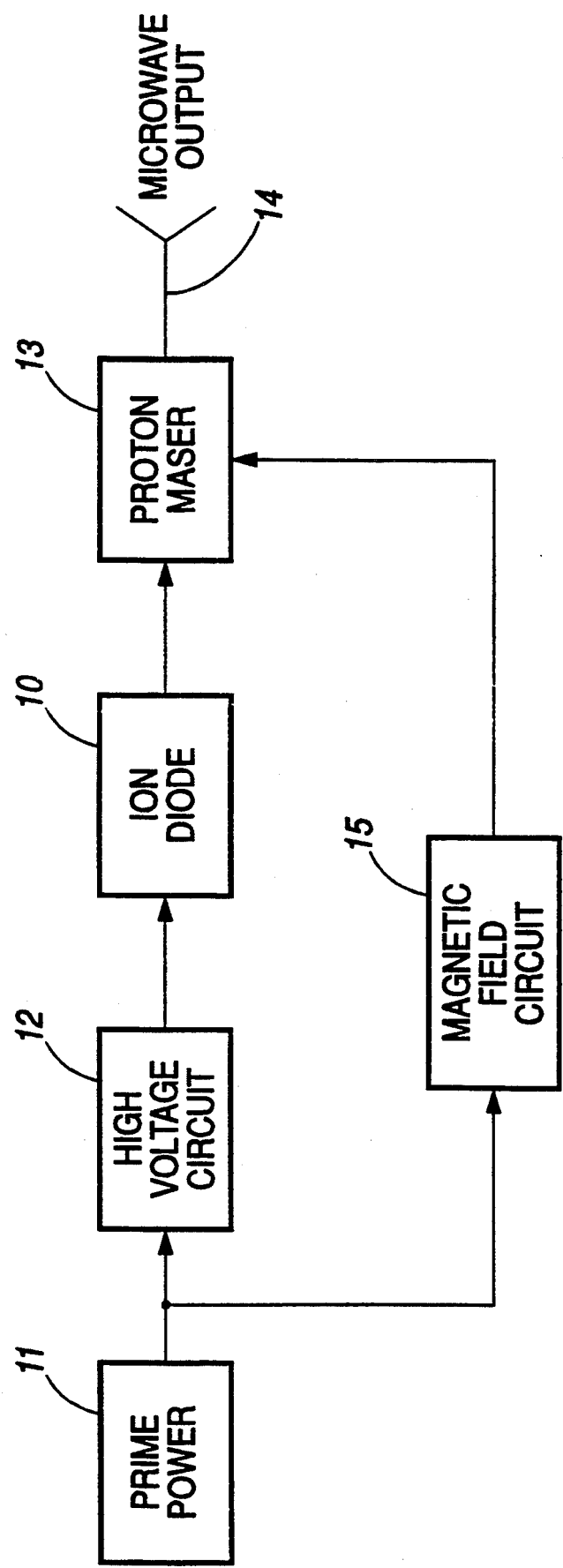
FIG. 1 is a block diagram of a proton maser embodying the present invention.

While the invention is susceptible to various modifications and alternative forms, a specific embodiment thereof has been shown by way of example in the drawings and will be described in detail herein. It should be understood, however, that it is not intended to limit the invention to the particular forms disclosed, but on the contrary, the intention is to cover all modifications, equivalents and alternatives falling within the spirit and scope of the invention as defined in the appended claims.

Turning now to the drawings and referring first to FIG. 1, the proton beam that is used in the present invention is preferably generated by an ion diode 10 which is supplied with electrical power from a prime power source 11 via a high voltage circuit 12. Ion diodes which produce proton beams are well-known, and examples are described in: H. Bluhm et al., "Progress in the Development of a High Power Focusing B-Applied Extractor Type Ion Diode for the 1.5 TW Pulse Generator KALIF," *Proceedings of the 8th Intl. Conf. on High-Power Particle Beams*, B. N. Breizman and B. A. Knyazev, Eds., Novosibirsk, 1990, (Pub. World Scientific), p. 451; P. D. Pedrow et al., "Proton Ring Formation and Trapping in a Gated Magnetic Mirror," *Phys. Fluids B* 1, 1059 (1989); J. B. Greenly et al., "Magnetically Insulated Ion Diode with a Gas-Breakdown Plasma Anode," *J. Appl. Phys.* 63, 1872 (1988); and J. B. Greenly, "Concepts for Repetitive Ion Diodes," *Proceedings of the 7th Intl.; Conf. on High Power Particle Beams*, W. Bauer and W. Schmidt, Eds., Karlsruhe, Germany, 1988, pp. 137–147. The preferred ion diode is the magnetically insulated type, using an applied radial magnetic field to control electron flow and distribution symmetry in the diode. The use of this type of ion diode permits control of beam angular dispersion to about a degree or less.

The proton beam is preferably charge-neutralized, but not current-neutralized, by electrons picked up by the protons when they pass through the cathode region of the ion diode. The charge-neutralized proton beam produced by the ion diode 10 is fed into a proton maser 13 to produce microwave power which is extracted from the maser through an output waveguide 14. The maser 13 also receives electrical current from a magnetic field circuit 15, which may be powered by the same source 11 which supplies power to the high voltage circuit 12 for the ion diode 10. As will be described in more detail below, the current from the magnetic field circuit 15 generates a magnetic field around the proton beam in the maser 13, to prevent electrons in the proton beam from loading the resonant cavities in the maser.

Figure 2:
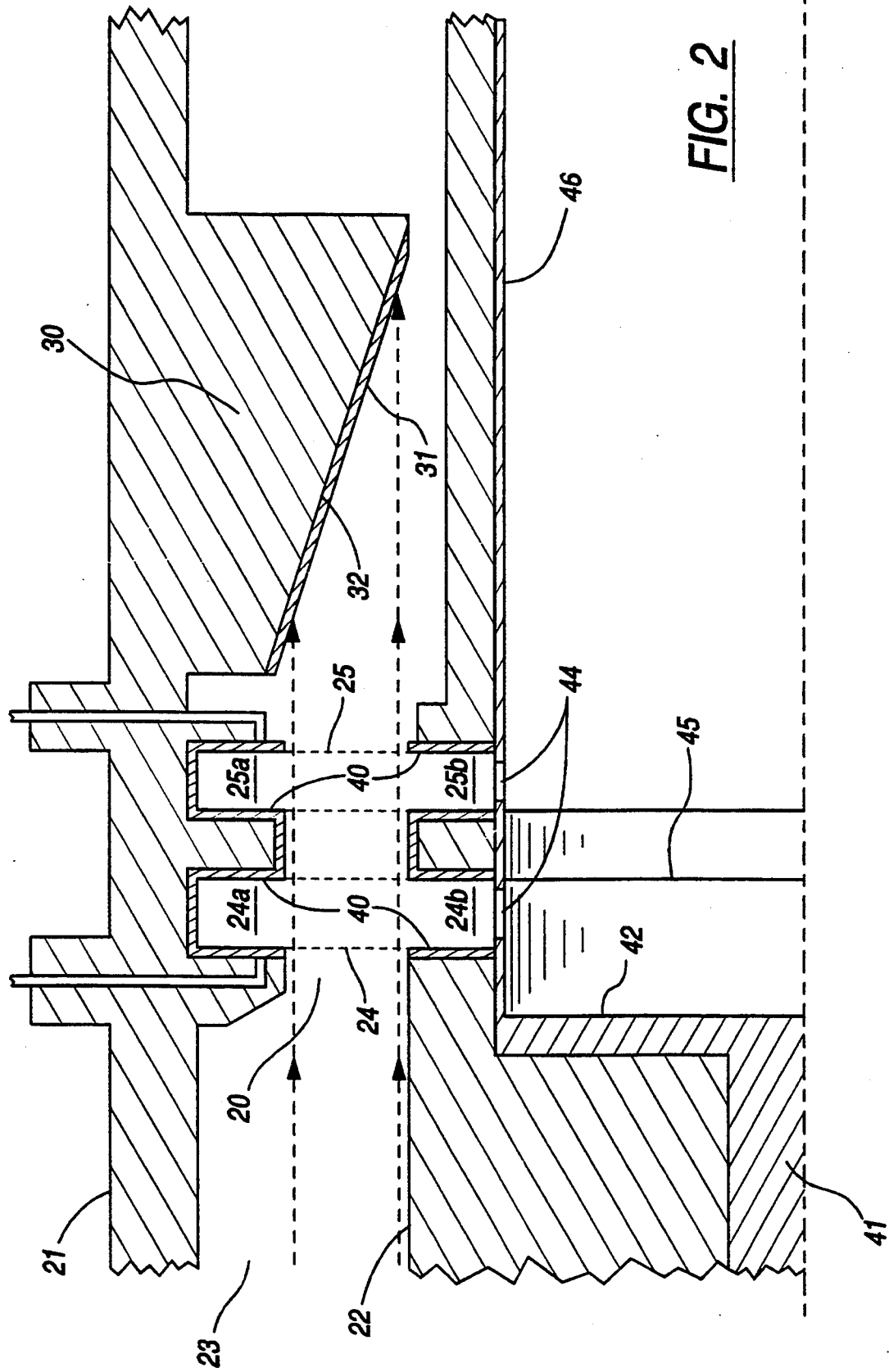
FIG. 2 is a longitudinal cross-section of one implementation of the hardware portion of the proton maser illustrated in FIG. 1.

One example of the proton maser 13 is illustrated in FIG. 2. In this embodiment, the proton beam is in the form of an annulus which can be fed into the maser through an annular entry port 20 formed in the end of an aluminum housing 21. Ion diodes for producing proton beams having this annular configuration are well known. The housing 21 has a cylindrical shape, and is preferably formed of solid aluminum. Extending into the housing and along the axis thereof is a coaxial core 22 which is also formed of solid aluminum. The space 23 between the inside surface of the housing 21 and the outer surface of the coaxial core 22 has an annular configuration, and the annular proton beam passes longitudinally through this space 23. As the proton beach travels through the space 23, the beam traverses a pair of resonant cavities 24 and 25 formed by two pairs of opposed annular recesses 24a, 24b and 25a, 25b formed in the opposed surfaces of the housing 21 and the core 22. These resonant cavities 24 and 25 extend around the entire circumference of the proton beam, on both the outside of the beam and the inside of the beam. The four recesses 24a, 24b and 25a, 25b are preferably identical to each other in both size and shape.

The proton beam produces an electric field $E_m$ in the resonant cavities 24 and 25. The cavities are dimensioned and shaped to produce a desired fundamental mode at a desired microwave frequency.

The proton beam preferably has a current density J of about 2 KA-cm$^{-2}$ and a pulse width of over 20 Ns with a 10% voltage drop during the pulse. The preferred beam-steering specifications are an inside radius of 5.5 cm. and an outside radius of 9.5 cm., both measured at 10 cm. from the cathode of the ion diode. The beam delta r spread should not exceed 5 mm. over a distance of 3 cm., from the 10-cm. location.

The housing 21 and the core 22 form a magnetic flux shield which helps shape and control the magnetic electron insulating field. The solid conductive metal of the housing 21 and the core 22 forms a shield because the flux from the magnetic field cannot penetrate by diffusion into the solid metal in a few microseconds, and the maser operates for times much shorter than this.

To dissipate the proton beam beyond the second resonant cavity 25, a beam dump 30 is formed by a metal plate 31 on a conical surface 32 formed by the housing 21. The conical surface 32 intercepts the entire cross-sectional area of the annular beam, and increases the geometrical projected area by about 3.525. The metal plate 31 is a material such as beryllium, carbon, molybdenum or vanadium and must be capable of absorbing the beam particle energy without vaporizing. After passing through the maser cavities, the beam energy is typically reduced to about 50% of its initial value.

At the same time the proton beam is turned on, the magnetic field circuit 15 is also turned on to supply current $I_m$ to field-producing conductors 40 lining the surfaces of the outer recesses 24a and 25a, i.e., the portions of the resonant cavities 24 and 25, formed by the housing 21. If desired, a thin layer of insulating material may be provided between the conductive lining 40 and the main body of the housing 21. The resultant magnetic field must be predominantly perpendicular to the desired mode electric field vector $E_m$ in the cavities, and preferably any component along the mode RF electric field is less than 5% of the maximum value to properly insulate the beam electrons and prevent them from absorbing appreciable RF power in the cavities. Thus, if $E_m$ is in the axial direction (a TM mode), the current that produces the magnetic field must flow in the axial direction. The magnitude of the magnetic field is determined by the operating frequency, and the resulting electron cyclotron frequency is a specified multiple of the mode field frequency. Generally, a 40 to 60 multiple is required to achieve the desired level of isolation of the electrons from the RF field.

In the inner portions of the resonant cavities 24 and 25, formed by the coaxial core 22, the current $I_m$ is supplied through a center conductor 41 and a disc 42 to field-producing conductors 43 lining the inner recesses 24b and 25b.

The need for an applied magnetic field depends upon the magnitude and polarization of the beam field, because a magnetic field is generated by the proton beam current itself. For example, in the embodiment of FIG. 2, a magnetic field is generated by the beam current density is around $\Theta$ and thus is perpendicular to the mode electric field, as desired.

The maser action, the stimulated emission of radiation by the beam proton into the microwave fields in the dual maser cavities 24 and 25, is initialized at a relatively low cavity field level by the time rate of change of current coming into the cavity as represented by the leading edge of the incoming proton beam. This shock excites the cavities in many modes within the bandwidth of the inverse rise time of the beam (in the range of 1 to 10 GHz). Among these modes is the desired one (e.g. at 3 GHz) and since the cavities 24 and 25 are designed to be tuned for stimulated emission at this frequency (the cavity gap is set for 2 Mev protons to cross an 8 mm. gap in 1.25 cycles at 3 GHz), only the desired mode is amplified with high gain (perhaps 25% growth per cycle in the second cavity). The other modes die out rapidly.

The rising RF fields continue to stimulate beam energy into microwave form. Since the first cavity 24 is mainly redistributing the proton velocity relative to the RF phase in the second cavity 25, its presence allows much higher gain in the second or output cavity 25 than obtainable in only one cavity. The gain and efficiency is much better with the second cavity, e.g. about 35% to 50% of the beam energy, as compared with perhaps 10% to 12% in the first cavity.

The fields within the cavities 24 and 25 come up to a value corresponding to saturation, and this is the saturated power output. Saturation level means the RF electric field has grown so large that the protons' cavity gap crossing time is field phase dependent and causes about a quarter cycle relative time spread in the crossing times of the beam protons as the cavity field reverses. Since the protons are relatively heavy as compared to electrons, a proton maser reaches very high saturation fields and power levels at saturation compared to electron devices.

Microwave power is extracted from the resonant cavities 24 and 25 through a series of output coupling slots 44, symmetrical and equally spaced about the periphery of the inside radius of each maser cavity. The slots 44 in the cavity 24 are coupled to a dummy load 45 which dissipates the energy. The slots 44 in the cavity 25 couple the mode RF fields to a propagating mode in an output guide 46, which in turn is coupled to an output horn matched to the impedance of the load. For transmission through the atmosphere or space, the load is the impedance of free space, about 377 ohms. Otherwise, these slots and the guide system are matched to a dummy load (as in one of the non-output cavities), or to another load, such as an RF energy measurement system (calorimeter) or similar load. The detailed shape and area of the coupling slots depends upon the details of the load impedance and the guide and cavity mode used, being adjusted for matching in each case, generally to reduce the VSWR to below 1.05.

For the preferred embodiment illustrated, the slots 44 are located around the 5 cm. radius of the 3 GHz axial proton maser cavities. The dummy load and output load in this case are adjusted for the same impedance, and the coupling slots are identical in both cavities. These slots are six in number, equally spaced, basically rectangular and approximately 2 mm. in width (along the z axis or direction of the incident beam) and 2 cm. in circumferential length along the curved portion of the cavities. These slots have rounded corners of radii about 1 mm., as well as broken edges by about 0.5 mm. at all edges. These slots extend uniformly through the cavity wall and interconnect with a circular output guide or dummy load.

Figure 3:
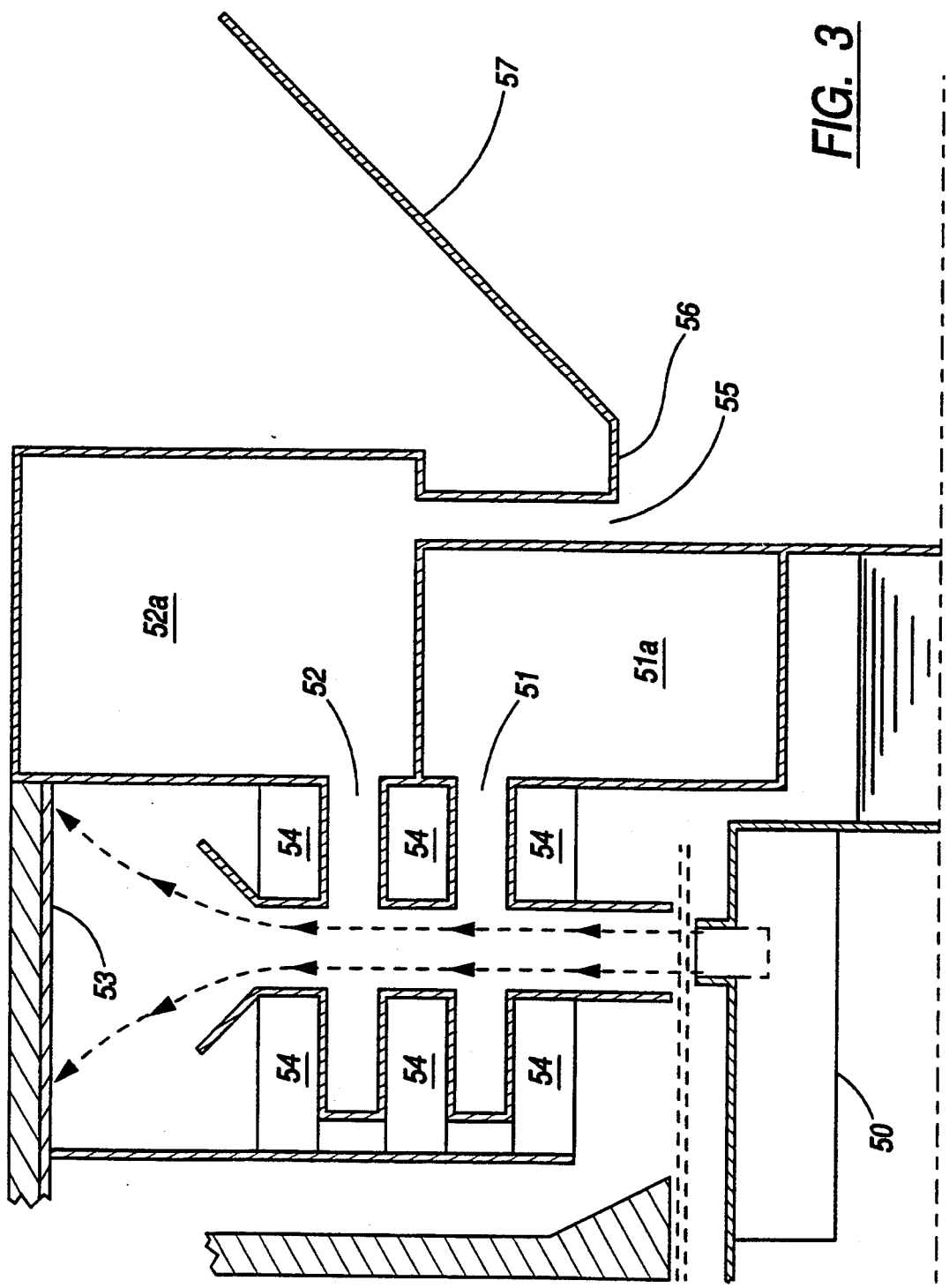
FIG. 3 is a longitudinal cross-section of a second implementation of the hardware portion of the proton maser of FIG. 1.
Figure 4:
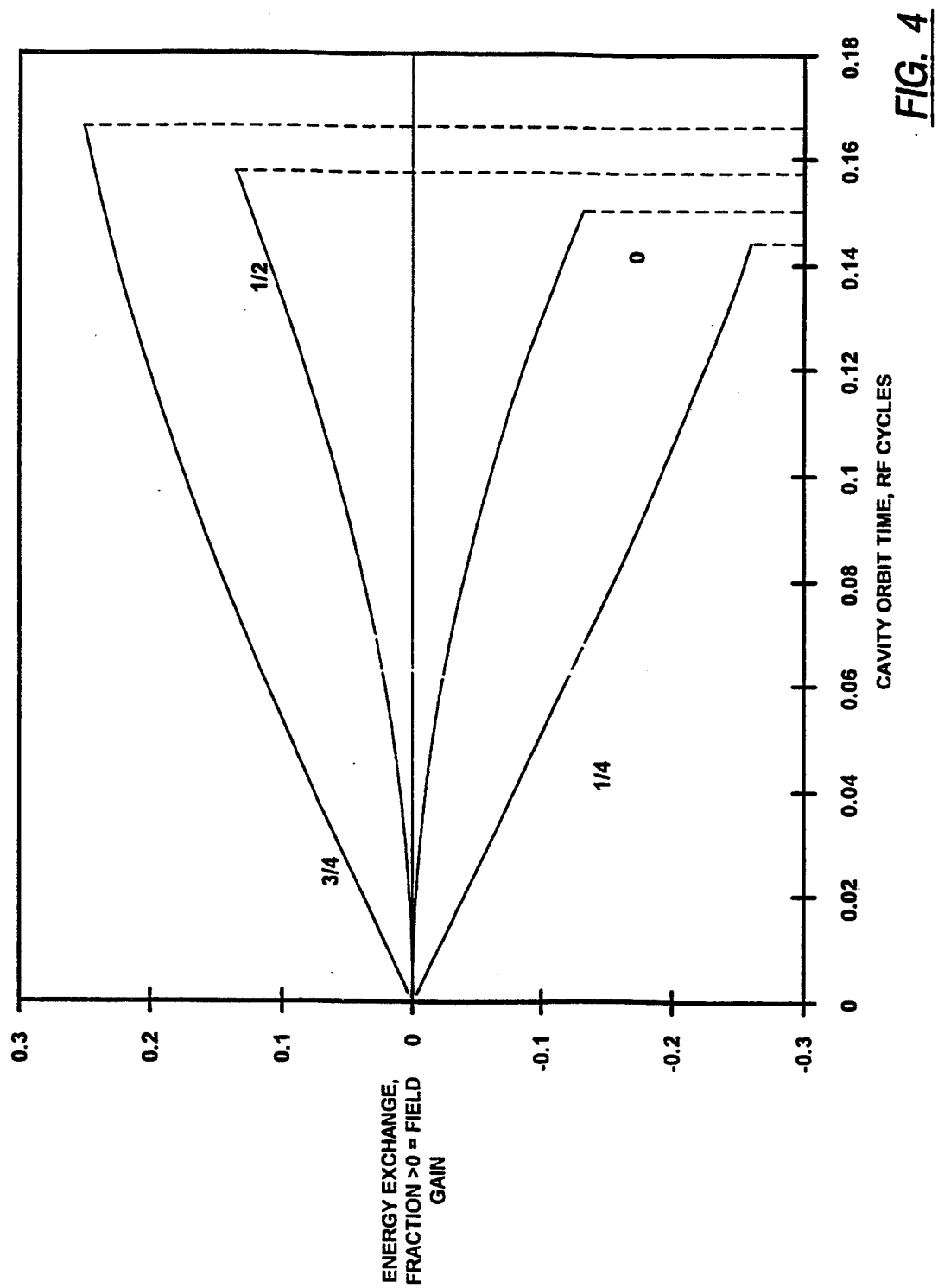
FIGS. 4–7 are graphs of the energy exchange for four phase groups for the protons separated by a quarter of an RF cycle, for four different values of the gap length $\Delta z$, evaluated at a mode electric field strength of $2 \times 10^4$ gauss, a frequency of 3 GHz, and a proton energy of 2 Mev.

A modified embodiment of the proton maser 13 is illustrated in FIG. 3. In this design the proton beam is launched radially from an ion diode 50. The diode 50 produces a radial, disk-shaped high-voltage ion beam with the protons and accompanying charge-neutralizing (but not current-neutralizing) electrons expanding out radially. The expanding beam passes through two successive resonant cavities 51 and 52 and, after losing energy to the fields in the cavities, spreads out in a region of reduced magnetic field radially beyond the second cavity 52. The spread-out beam is finally dissipated in a cylindrical beam dump 53.

The desired magnetic field is generated by energizing Helmoltz coils 54 around the cavities 51 and 52. The magnetic field B produced by the coils 54 must be perpendicular to the desired mode E field. For example, when the winding for the current $I_m$ extends around $\Theta$, the resulting field B extends along the z axis, which is perpendicular to a TE-mode field around $\Theta$. If desired, additional smaller windings may be located adjacent each cavity further out along the radius to help maintain the applied field B at desired levels.

The expanding protons spiral outwardly in the applied field B, acquiring a velocity component about $\Theta$ as they pass through the resonant cavities, allowing them to do work on the $\Theta$-mode electric field (e.g., stimulated emission). As described previously, the desired magnitude of the applied field B is determined by the desired electron cyclotron frequency, and can also provide an angle of deflection of the 2-Mev protons of about 45° along $\Theta$ as they pass through the resonant cavities and impact on the beam dump 53.

Preferably, the applied magnetic field is also perpendicular to the maser mode magnetic field, to prevent the latter field from partially cancelling the insulating field every half cycle when the two fields have opposite polarities. Avoiding such cancellation is especially preferred when the mode magnetic field comes up to values approximating the magnitude of the applied magnetic field, which occurs at saturation. A higher gain is achieved if the applied magnetic field, the mode electric field, and the mode magnetic field are all mutually perpendicular within the maser interaction volume, as in the embodiment of FIG. 3.

The resonant cavities in the embodiment of FIG. 3 are narrow at the beam transit gap, and expand to larger-volume resonant regions 51a and 52a. This type of cavity configuration provides the desired mode frequency and field distribution for a TE mode with E about $\Theta$. As in the first embodiment, microwave power is extracted from only the second cavity 52, through slots 55 leading into a waveguide 56 and an output horn 57.

A principal advantage of the embodiment of FIG. 3 is that it permits the use of the TE-type mode throughout the entire maser system, avoiding entirely the problem of terminating mode electric fields or metal boundaries and thus minimizing electron field emission breakdown from the walls of the cavities and output guides. As illustrated in FIG. 3, the radial proton maser utilizes only smooth, continuous coupling gaps or irises matched to any load. In this case the use of a TE cavity mode, in order to eliminate normal field termination on metal boundaries and avoid field emission of electrons, is continued throughout the design. Magnetic RF field coupling to an output TE guide mode, and then to the output load with a similar mode structure, is provided only through gaps with no other material obstructions of any kind present.

In the case illustrated, for a 3 GHz radial proton maser, the cavity coupling slot from the output cavity to propagating circular guide mode (TE 011 mode) is 6.5 mm. in width along z and extends radially 3.2 cm., with rounded corners of radii 1 mm., and connects directly to the circular guide, intended in this case for matching to free space impedance using a matched horn. The exact width and radial extent of the output coupling gap depends upon the selected load, and will vary in general for other loads.

The single particle behavior of a charged particle going through a fixed distance in an RF field can be understood by considering the time history of energy exchange for each particle as it progresses through the cavity gap. The effects of magnetic fields and self space charge fields will be taken into account later. For a proton maser operating from a neutral beam the self space charge fields are small, and both the mode and applied magnetic fields are only relatively small perturbations on proton orbits at the energies used in the proton maser.

Taking as a model cavity a gap along one coordinate, the RF mode electric field E(t) is represented by a sinusoidal time variation and is constant in space and directed along the direction of the incident protons. Explicitly, this field can be represented with the equation, $E(t) = E \sin(\omega t + \Phi)$, where $\Phi$ represents the arbitrary initial incident phase of the protons. The gap has width $\Delta z$, and the unperturbed transit time for all incident monoenergetic protons is $\tau_0$.

In addition to the above electric field, an equation is needed to represent the work done (energy exchange), e, by a charged particle of charge q in the above field after interacting for a time $\tau(\Phi)$. A positive value indicates the particle does work on the field:

$$e = -q \int_0^{\tau(\Phi)} E(t) v_z(t) dt \quad (1)$$

The orbital velocity, $v_z(t)$, is a function of the field, E(t), which is doing work (or having work done on it) and changing the velocity of the particle. This is a general expression, valid for any value of $\Phi$ and any time $\tau(\Phi)$ from zero, when the particle enters the gap with initial speed, $v_z(\Phi)$, up to the transit time, $T(\Phi)$, when the particle leaves the field gap. The transit time will be different in general for each value of $\Phi$ between zero and $2\pi$. It would only be independent of $\Phi$ in the limit of the electric field vanishing, and would then equal $\tau_0$ for all particles.

The value of e depends upon both the magnitude of the integrand and the limit of the integral.

For simplicity, one can also assume an initially (incident) uniform beam with all phases equally represented (unbiased).

To represent the beam interaction, the above integral can be evaluated along the orbit or time history of each of four phase groups for the particles, separated by a quarter of an RF cycle. An approximate beam average energy exchange can be formed by taking a simple arithmetic average of the four e values, evaluated at the transit time for each.

Such a calculation is shown graphically in FIGS. 4 through 7. Each figure is for a different value of the gap length $\Delta z$, indicated on each figure by an appropriate legend. These figures show each orbital value of e accumulated during the crossing of the gap and up to the transit time, which is the end of each orbit in the figure. Note the accumulated relative transit time spread between the phase groups.

FIGS. 4–7 are evaluated at a mode electric field strength of $2 \times 10^4$ gauss, a frequency of 3 GHz and a proton energy of 2 Mev. This field is sufficiently strong to provide relatively large transit time variations which can be easily seen on the graphs. All e values go through zero at a time of one cycle within the cavity (if the cavity gap is sufficiently wide so all phases exit after one cycle in the cavity). The chosen incident phases are indicated, 0, $\frac{1}{4}$, $\frac{1}{2}$ and $\frac{3}{4}$ RF cycle.

The integrand in the equation for e represents the rate of energy exchange between field and particle. It is proportional to the particle velocity for a given E field. Suppose two phase groups, $\frac{1}{2}$ cycle apart, indicated by the 0 and $\frac{1}{2}$ cycle orbits shown (see FIG. 4, which is for the small gap of 0.1 cm.), were to encounter the same electric field, except for sign. The particle gaining energy will continue to absorb power at a faster rate than the one losing energy for this reason. This effect can be seen even from zero time, with the upper curve slightly smaller than the lower one. The transit time for the speeded up particle decreases, and that for the slowed down particle increases. The first effect is true even if there were no difference in the transit time.

A small transit time difference accumulates, but is not sufficient to provide net field gain at this small gap.

If the gap were made progressively larger, then eventually, after a cycle in the cavity, the transit time gain by the slow particles relative to the faster ones, which is a cumulative effect, begins finally to overcome the difference in the rates because the portion of the RF cycle which would re-accelerate the faster particles is not available to them because they leave the cavity prior to this portion of the RF cycle. The slower ones remain in the RF for the phase of the RF which slows them down, and produce net energy from particle to field.

Hence for small gaps, unlike arbitrary ones, the transit time effect is small and unable to overcome the intrinsic rate of emission or absorption which then produces the effect of always giving energy to the beam in the small gap limit. Mathematically, one could say that the integrand in the e expression dominates the effect of variations in the upper limit, in the limit of small gaps.

Figure 5:
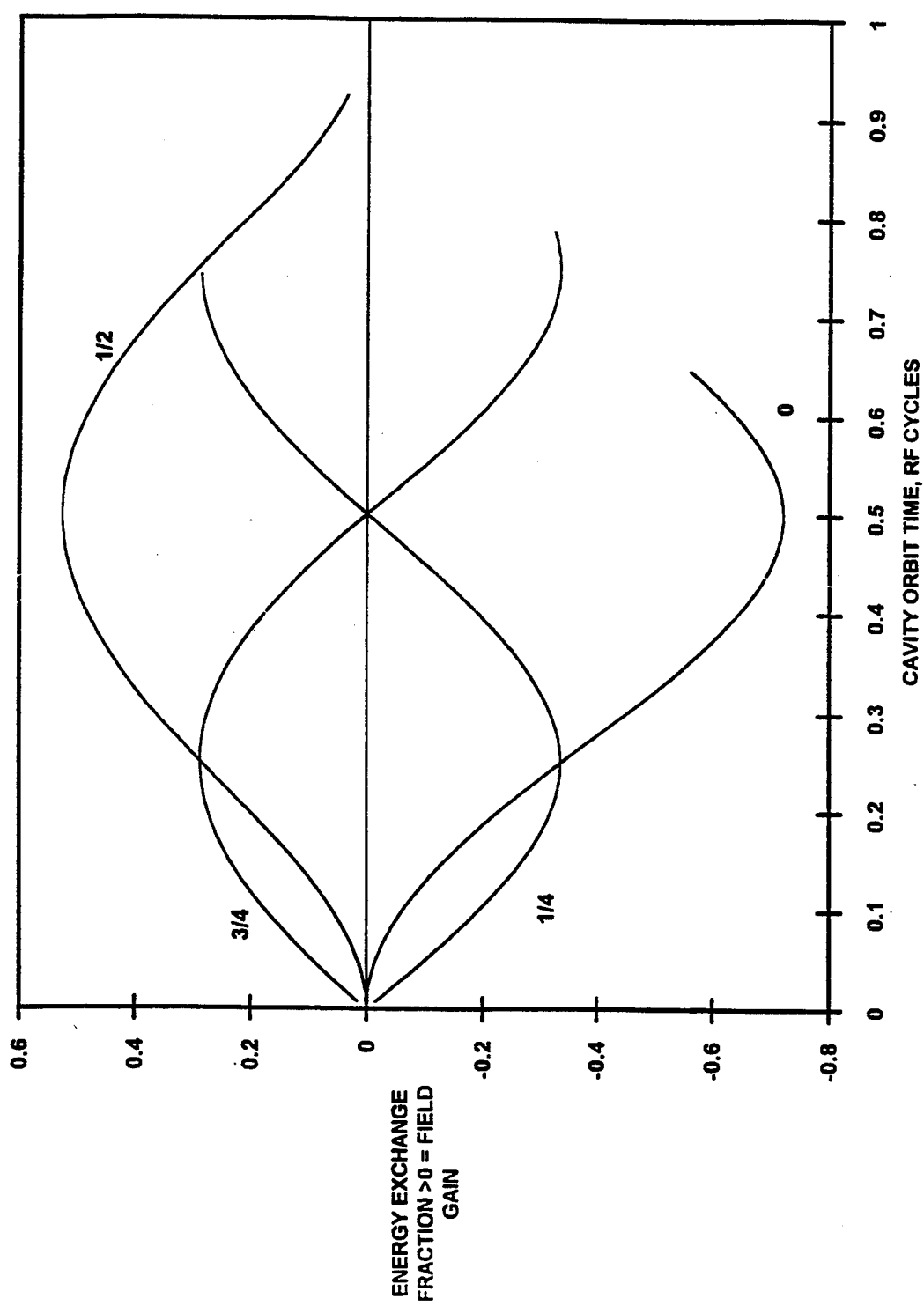
Figure 6:
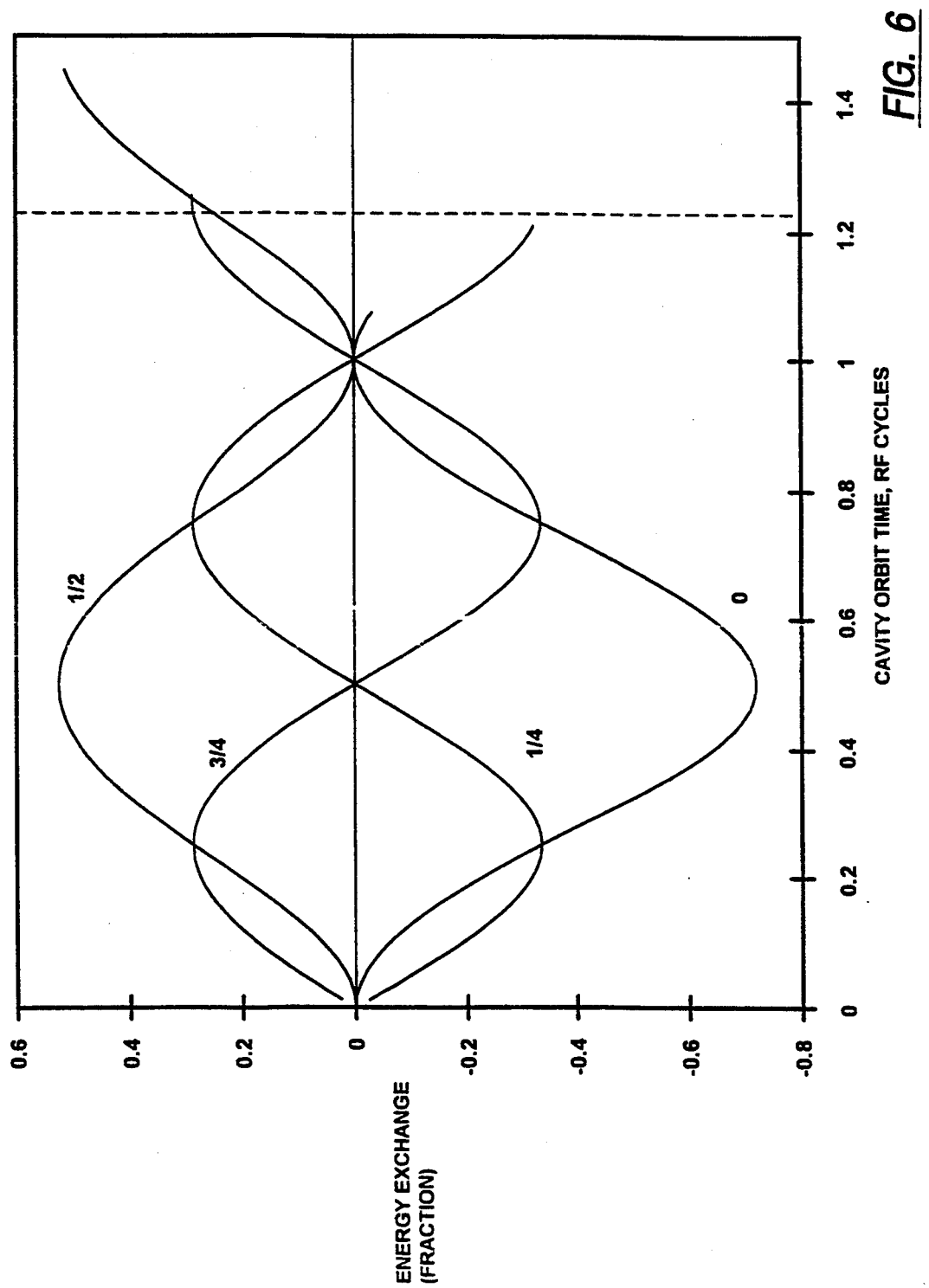

FIGS. 5 and 6 correspond to a $\tau_0$ of about $\frac{3}{4}$ and $1\frac{1}{2}$ cycles, respectively. As can be seen, the $\frac{3}{4}$ cycle gap optimizes particle gain, and the 1 $1\frac{1}{4}$ cycle gap optimizes field gain (oscillator tuning). The reason for this is that the value of e is now dominated by the transit time effect.

The $\frac{1}{4}$ and 4/4 phase groups are always slowed down and speeded up by about the same amount and have nearly identical transit time. As a result, they nearly cancel each other's energy changes regardless of the gap.

Concentrating upon the phase groups at 0 and $\frac{1}{2}$ cycle, the dominate effect of the transit time spread between these particles can be seen. For the $\frac{3}{4}$ cycle wide gap ($\tau_0$) of FIG. 5, the increased transit time for the $\frac{1}{2}$ cycle group causes them to remain in the field until their initial energy loss to the field is given back to them and brings their energy back essentially to the incident value. On the other hand, the shortened transit time for the 0 phase group prevents them from seeing the portion of the RF cycle which, had they remained in the cavity, would have slowed them down and removed the excess energy given to them in the first portion of the RF cycle.

The $1\frac{1}{4}$ cycle wide gap of FIG. 6 illustrates the effects of transit time, but with the opposite sign result from that indicated above. After the zero energy point at one cycle, transit time increases by the slowed down particles in the $\frac{1}{2}$ cycle phase group can now cause them to see the field phase which slows them down, while those in the 0 phase group leave too early for the phase which would have accelerated them to higher energies.

Until the zero point is reached and the $\frac{1}{2}$ cycle phase group is slowed down and the 0 group speeded up, just as at the cavity entrance, it would not be possible for the phase of the RF seen by the particles which are slowed down to correspond to the proper sign for giving those particles the net energy loss over that gained by the speeded up particles. Thus, about $1\frac{1}{4}$ cycles of gap are needed in order to provide oscillator tuning and for the beam to give net energy to the field.

In the case shown in FIG. 6, the four values of e upon exiting the cavity are, in fractions of initial energy, given by:

| Phase group | energy change, e fraction | transit time cycles |
| --- | --- | --- |
| 0 | −0.032 | 1.07 |
| $\frac{1}{4}$ | −0.320 | 1.21 |
| $\frac{1}{2}$ | +0.513 | 1.45 |
| $\frac{3}{4}$ | +0.287 | 1.25 |

Arithmetic average = +.488/4. = 0.112 = 11.2%

A numerical average using 100 phase groups gives a net value of 11.7%.

Mathematically, one could say that the expression for e is dominated by the upper limit rather than the integrand.

Figure 7:
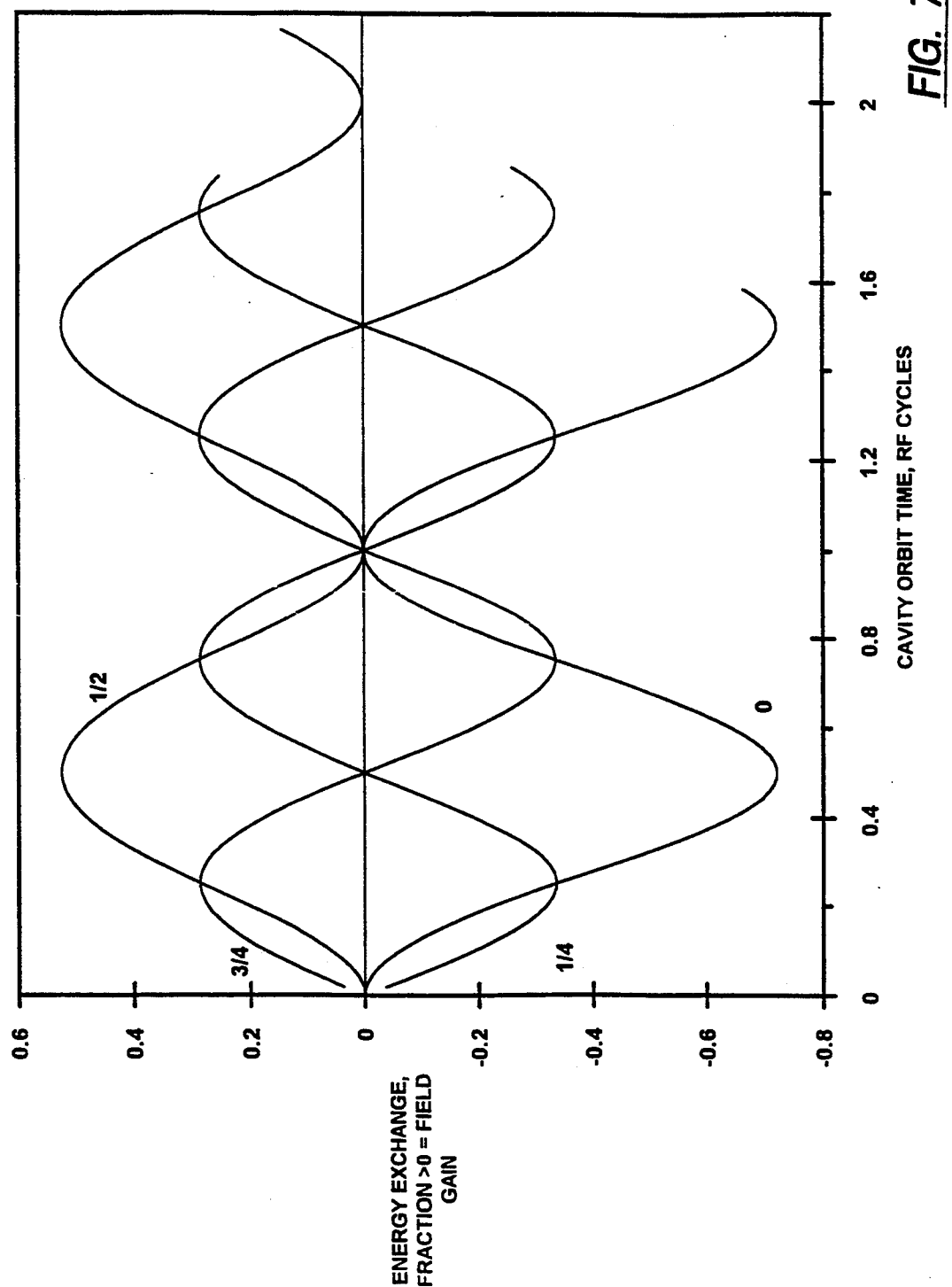

FIG. 7 illustrates a case in which the gap is 1.842 cycles wide for $\tau_0$. The transit time spread between the 0 and $\frac{1}{2}$ cycle phase groups has grown to about 0.55 cycles, and produced again a net acceleration to the beam.

The net change in particle energy after transiting the gap, averaged over all incident phases relative to the mode electric field, is $<e>$. In the previous orbit analysis, some examples were given in which just four representative phases were followed and averaged. $<e>$ here refers to this same quantity, only averaged over many phase groups to provide any desired numerical accuracy.

The incident ion beam particle density is N, the incident velocity is $V_z$, the charge is q, and the gap width is $\Delta z$. Since the electric field in this simple model does not vary over the lateral dimensions or with z, $<e>$ represents the effective beam average energy exchange. In case the field depends upon x, y but still not on z, one would take an average of $<e>$ over the beam cross section to obtain this beam average value of energy exchange per particle.

If one multiplies $<e>$ by the incident particle flux $NV_z$, the energy per unit time and area given to the cavity is obtained. If this result is multiplied by (averaged over) the beam area $S_b$, the energy per unit time given to the cavity is obtained. If cavity stored energy is denoted by W, one could write $$\frac{dW}{dt} = NV_z S_b <e> \qquad (2)$$

W can also be written as the integral over the mode (cavity) volume of the RF energy density, which for the simple mode used here can be written:

$$W = \frac{1}{8\pi} \int_{vol} E^2(x,y,z) dx dy dz = S_c \Delta z E^2/8\pi \qquad (3)$$

$S_c$ = cavity area

If, as assumed here, the beam completely covers the cavity, $S_c = S_b$. A general expression for the gain G, valid for any case including this simple one, is:

$$G = \frac{1}{W} \frac{dW}{dt} = \frac{8\pi N V_z <e>}{\Delta z E^2} \quad [sec^{-1}] \qquad (4)$$

This can also be expressed as cavity energy gain per cycle by multiplying by the RF period, $f^{-1}$, where f is mode frequency.

The gain is proportional to $<e>$ and inversely proportional to the gap width for a given mode field strength and beam current. Expressed in terms of gain per cycle and beam input current density, the gain is given by ($J = qNV_z$):

$$G = \frac{8\pi J_b <e>}{qE^2 \Delta z f} \quad [cycle^{-1}] \qquad (5)$$

The intuitive reason for this dependence is the beam surface area to cavity volume ratio. For a given beam area, the smaller $\Delta z$ (cavity volume), the more rapidly a given energy flux can change the mode field energy, and the higher the gain. There have been no assumptions as to field strength and the gain expression is valid for arbitrary fields and vales of $<e>$. Note that $<e>$ is found theoretically to vanish faster than linear in $\Delta z$ and therefore G approaches zero as $\Delta Z$ approaches zero.

Figure 8:
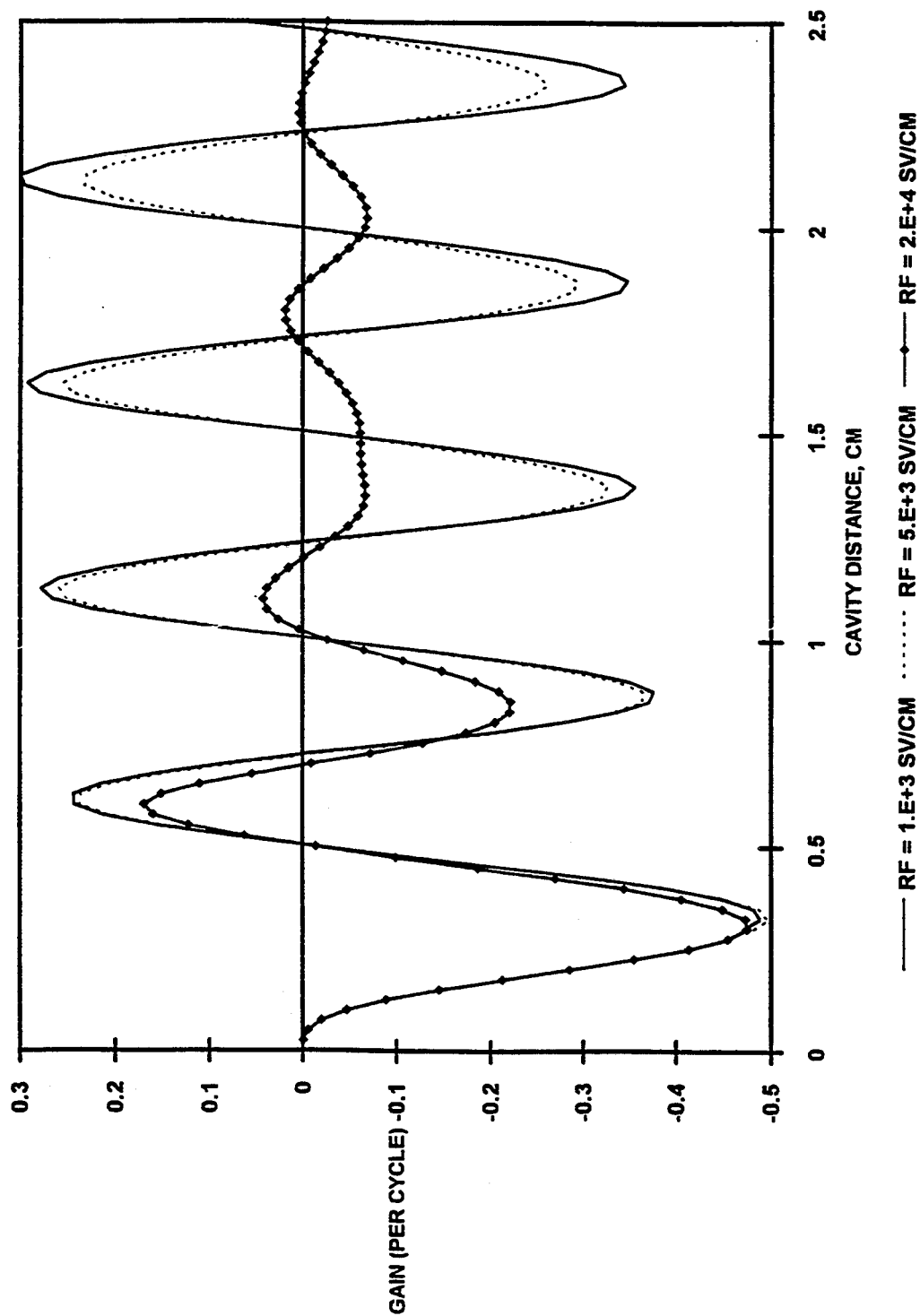
FIG. 8 is a graph of gain as a function of cavity position.

A perturbation treatment for small E provides a gain independent of E (e.g., exponential in that regime). FIG. 8 illustrates numerical output for the gain as a function of cavity position.

The transit time spread between various initial phase groups is found to be cumulative with cavity distance. This difference is responsible for the net energy transfer of energy to or from the cavity (e.g. $<e>$). These proton orbits were computed for a given RF field strength, and various cavity distances and transit times.

For a given cavity tuned gap the magnitude of the work done by the particles will be directly proportional to the mode field strength. Hence, looking at a typical orbital picture, the transit time spread increase with E will continue until finally the sum over initial phases of the work done in transiting the gap will be zero, $<e> \to 0$ and $G \to 0$.

Figure 9:
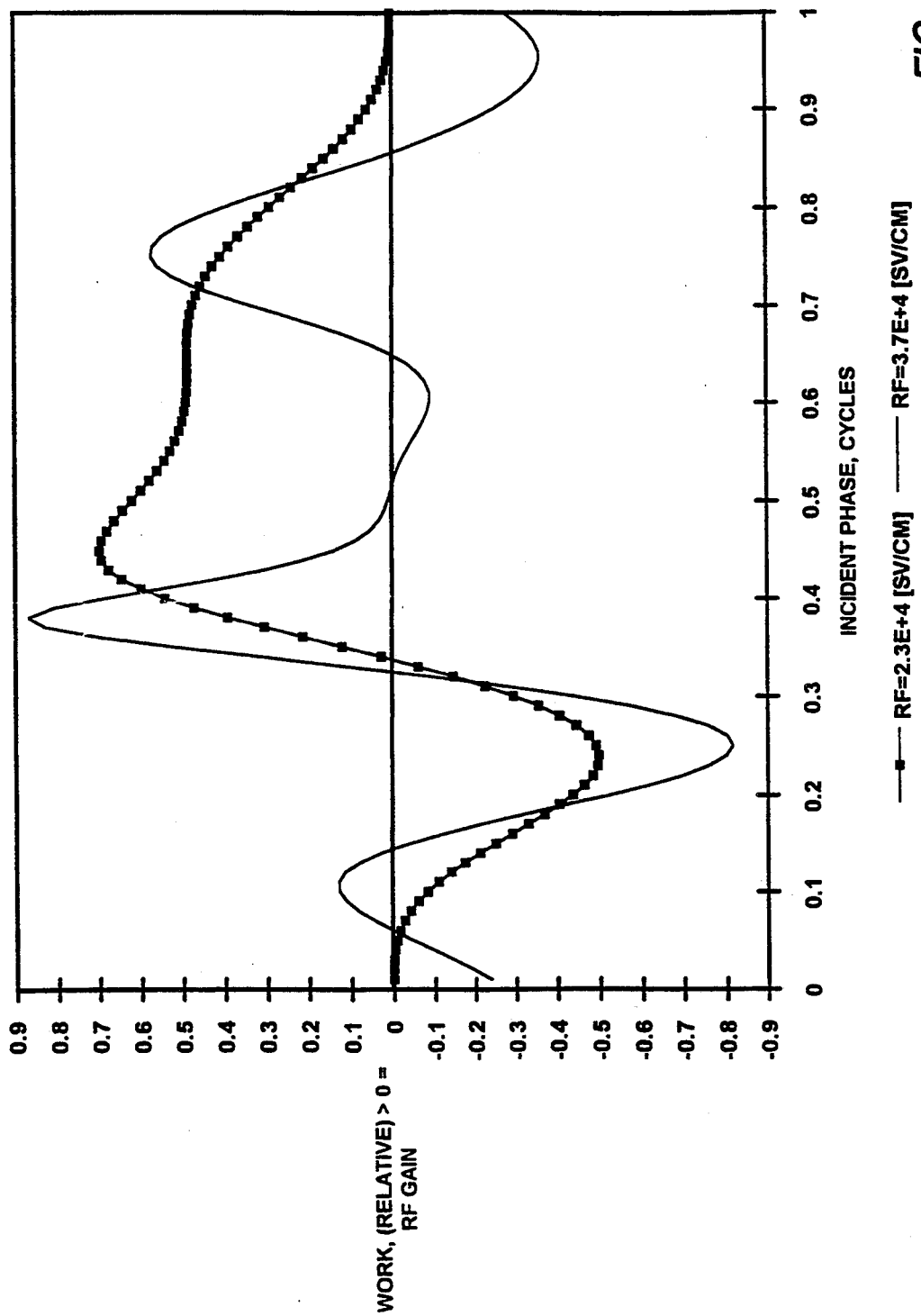
FIG. 9 is a graph of the work done as a function of incident phase, for two values of mode field strength.

FIG. 9 illustrates this effect for two values of mode field strength. The lower mode field corresponds to an unsaturated value of G, as explained earlier (tuned to 0.62 cm. for the assumed 1.2 Mev beam). The higher field value shows the relative transit time shift between various initial phase groups has approached a half RF cycle, they are near cancellation and the gain is near zero. This is what is meant by the term "saturation" as applied to a proton maser. This illustrative calculation was done for an otherwise unloaded cavity.

In operation, the proton maser never sees the condition for G=0 because this would only be the case for a completely unloaded cavity. In practice, the plasma and output loading will tend to provide a small negative gain, and when the field comes up to provide a net gain of zero, the beam energy converted to RF is equilibrated against this loss and remains in stable equilibrium at this "operating point."

It is the direction of the mode electric field with respect to the induced RF current density, not the average beam current density (in the direction of propagation), which determines the net rate at which work is done by the beam particles on the RF mode. The induced current, $J_{RF}$, is proportional to the electric field causing it. The total current density is the sum of $J_{RF}$ and the initial incident current density in the direction of propagation, $J_0$.

The rate $\dot{e}$ of doing work per unit volume from beam to RF can be written symbolically as:

$$\dot{e} = -(J_0 + J_{RF}) \cdot E_{RF} \qquad (6)$$

The first term will contribute nothing to the average energy exchange as the electric field reverses phase relative to $J_0$ with time, or at a given instant at two different space points with opposite polarizations of $E_{RF}$. The second term, however, will in general produce an average under both circumstances, as will be shown in more detail below. It is the second term which represents the macroscopic manifestation of the microscopic stimulated emission process.

Progress from the microscopic to the macroscopic description can be made in two steps; first considering the energy exchange for each beam particle, and then going to the limit of a continuous charge and current density.

From the classical definition of work done by a charged particle on an electromagnetic field:

$$w = -q \int_0^T E_{RF} \cdot v_p dt \qquad (7)$$

where $v_p$ is the proton velocity and q is the charge. There are two manifestations of stimulated effects in this simple equation. The first is that $v_p$ is a function of $E_{RF}$, which is accelerating the beam particles. Secondly, as a result, the crossing time for the protons, $\tau$, is also a function of the phase of the electric field. In order to arrive at an average over the entire beam, one then needs to carry out individual orbit calculations for each phase of $E_{RF}$, with the corresponding values of $v_p$ and $\tau$, and then average over these phase dependent values of w. The average value of energy exchange per proton thus arrived at can then be multiplied by the initial incident particle flux to produce a value for power transfer to or from the mode.

This same result can be arrived at by doing a quantum mechanical calculation, in which the field is treated as an initially populated photon state, and individual rates of stimulated and spontaneous emission and absorption of photons for each particle are computed.

It is clear that the basic non-linearity in the particle orbit caused by $E_{RF}$ is responsible for other than a null result for average energy exchange.

A familiar fluid description may be arrived at by integrating over the velocity distribution of the beam particles, representing the flux of particles by a current density, $J_t$, and a localized value of velocity in a fluid of charged particles, $V_p$, and local particle density N, so that $J_t = qNV_p$. N is considered small (but still large enough to be continuous) such that space charge electric fields can be ignored compared to $E_{RF}$. One can then solve the equations of motion and continuity for the velocity and corresponding particle density and form the current density for any particular initially excited mode of cavity oscillation.

In order to construct a mode in which the electric field presents a symmetrical pattern to the uniform incident beam such that an apparent cancellation of energy exchange would result from a linear interaction, we may choose a rectangular cavity in a $TE_{021}$ mode. The electric field is polarized along the x axis, with resonant gap $\Delta x$, width $y=b$ and height $z=L$. A single period of the electric field extends from $y=0$ to $y=b$, and a half period from $z=0$ to $z=L$. The explicit form for the field is:

$$E_{RF} = E_x(y,z)e_0^{-i\omega_0 t} = E_0 \sin(2\pi y/b) \sin(\pi z/L)e_0^{-i\omega_0 t},$$

$$E_y = E_z = 0 \qquad (8)$$

The beam is incident along the x axis, parallel and anti-parallel to the mode electric field. Thus, at any instant, from $y=0$ to $y=b/2$ the quantity $J_0 \cdot E_{RF}$ has equal and opposite values from those corresponding to points reflected through the mid-plane, from $y=b/2$ to $y=b$, for each value of z. Integrating this quantity over the volume would then yield a result of zero for net power transfer. The actual current density computed for this case is, however, not the incident density $J_0$, but rather is given by:

$$J_t = J_0 + \frac{\omega_p^2}{4\pi\omega_0}[i(1-e^{ikx}) - kxe^{ikx}] E_x(y,z)e^{-i\omega_0 t} = J_0 + J_{RF} \qquad (9)$$

The second term in equation (9) represents the induced RF current density, and it is proportional to the mode electric field. In the language of plasma physics, it represents the dielectric response of the beam. There will now be a non-zero net interaction, the time average of which is given by $-\text{Re}J_t \cdot E^*_{RF}/2$. In these equations the unloaded mode eigenfrequency is given by $\omega_0^2 = c^2 k_m^2 = c^2\pi^2[(2/b)^2 + (1/L)^2]$, and the induced RF density wave number on the proton beam is $k = \omega_0/U_0$, where $U_0$ is the incident beam speed. Hence, the value of the time average rate at which the beam gives energy to the field at any point in the cavity is given by:

$$-\text{Re}(J_t \cdot E_{rf}^*)/2 = \frac{\omega_p^2}{8\pi\omega_0}(kx\cos kx - \sin kx)E_x^2(y,z) \qquad (10)$$

a result independent of the sign of $E_x$, and having, for instance, the same value at corresponding points in y reflected through the midplane at $y=b/2$.

In order to show this result more explicitly, we can form the time dependent current, $\text{Re}(J_t)$, and electric field, $\text{Re}(E_{RF})$, separately and then take a product. This will demonstrate the two fundamental characteristics which must be present in this product for obtaining net power transfer; we must in general have both a non-zero time average at any point, x, y, z, as well as a non-zero value at any instant $\omega_0 t$ when averaged over the interaction volume.

We then have for the explicit time and space dependent rate of energy exchange:

$$\text{Re}(J_t)\text{Re}(E_{RF}) = J_0 E_x(y,z)\cos\omega_0 t + \frac{\omega_p^2}{4\pi\omega_0}[\sin\omega_0 t \cos\omega_0 t + \qquad (11)$$

$$\sin kx \cos^2\omega_0 t - \cos kx \sin\omega_0 t \cos\omega_0 t - kx\cos kx \cos^2\omega_0 t -$$

$$kx\sin kx \sin\omega_0 t \cos\omega_0 t]E_x^2(y,z)$$

Figure 10:
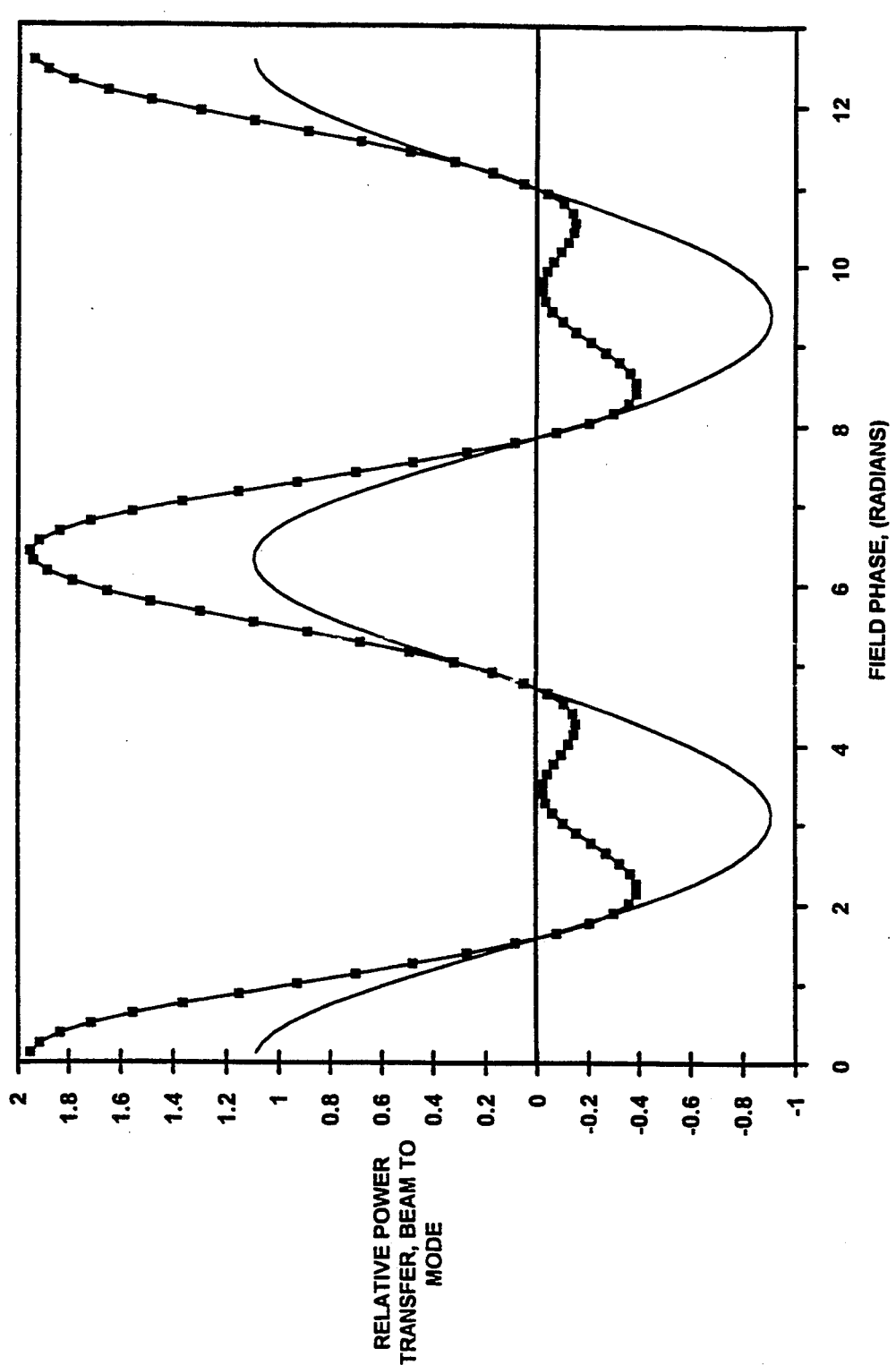
FIG. 10 is a graph of the relative power transfer as a function of field phase for various values of the field strength parameter.

After collecting constants and letting $J_0 \nu = \omega_p^2 E_x/4\pi\omega_0$, we have plotted as a function of the dimensionless mode field time, $\omega_0 t$, the function $-\text{Re}(J_t)\text{Re}(E_{RF})/J_0 E_x$ in FIG. 10 for various values of the field strength parameter $\nu$. $E_x$ is the peak value of mode field, $E_x(b/4, L/2) = E_0$. This plot shows clearly the non-linearity in time producing the time average shown earlier in equation (10).

Figure 11:
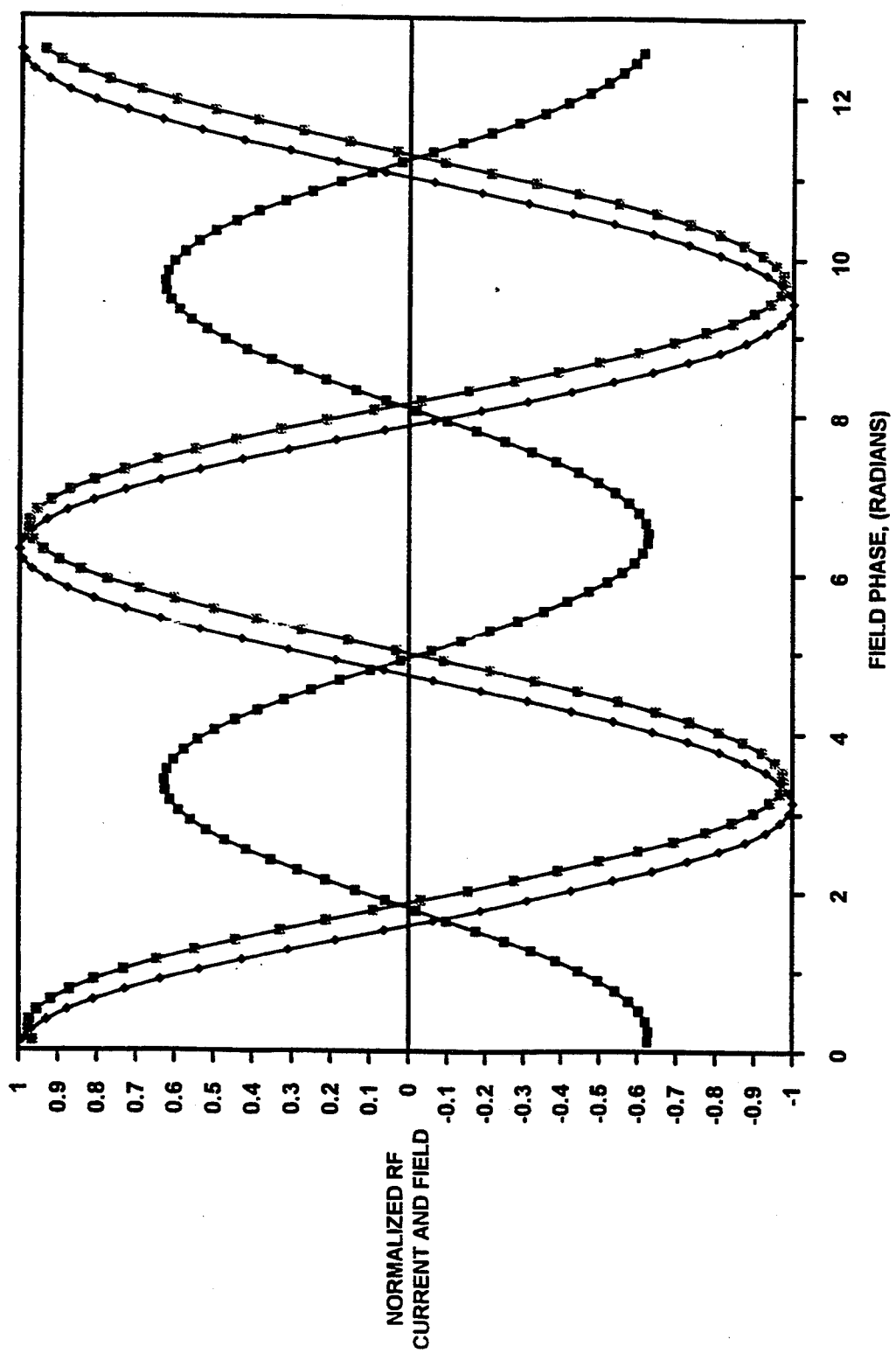
FIG. 11 is a graph of the normalized RF current and field as a function of field phase.
Figure 12:
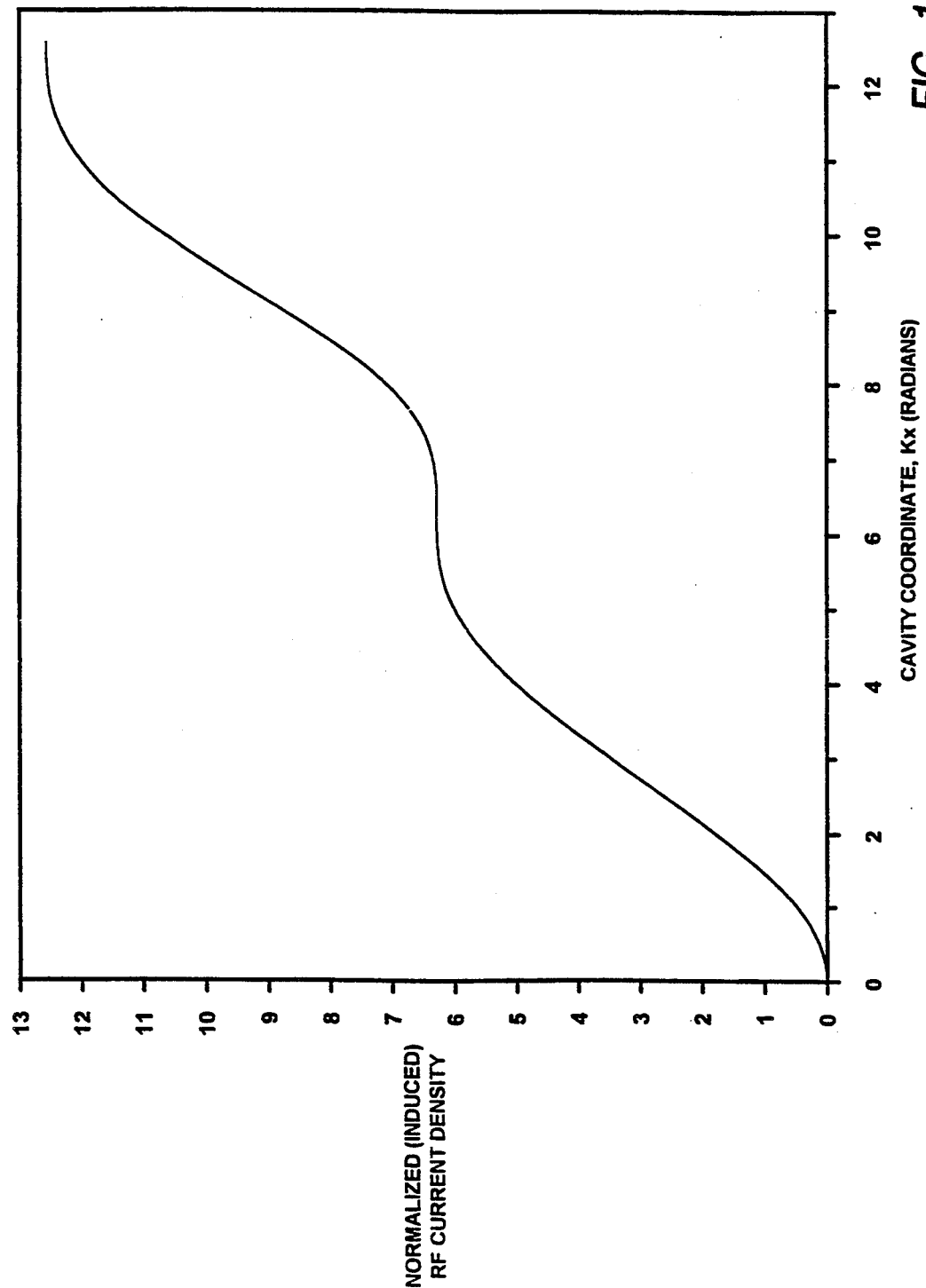
FIG. 12 is a graph of the normalized RF current density as a function of cavity depth.

$\text{Re}(J_{RF})/J_0$ and $\text{Re}(E_{RF})/E_0$ are plotted separately in FIG. 11, showing the relative phase dependence on cavity depth, x. FIG. 12 shows the magnitude of $J_{RF}/J_0\nu$ as a function of cavity depth. The field strength parameter, $\nu$, is indicated on the graphs by "nu."

I claim:

1. A method of generating microwave power, said method comprising the steps of
   producing a charged-particle beam that is charge-neutralized by electrons, said charged particles being heavier than electrons, and
   passing said charge-neutralized beam through at least one conductive cavity which is resonant at a selected microwave frequency and in a selected fundamental mode.

2. The method of claim 1 which includes the step of extracting a microwave beam from said resonant cavity.

3. The method of claim 1 wherein said charged-particle beam is a proton beam.

4. The method of claim 1 which includes the step of generating a magnetic field within said resonant cavity and perpendicular to the mode electric field to prevent the electrons in the charged-particle beam from loading said resonant cavity.

5. The method of claim 1 in which said charged-particle beam is passed through at least two of said resonant cavities spaced along the path of the beam.

6. The method of claim 5 wherein said resonant cavities are identical to each other.

7. The method of claim 5 which includes the step of extracting a microwave beam from the second of said resonant cavities.

8. The method of claim 1 which includes the step of terminating said charged-particle beam by intercepting the beam with a conductive surface that intersects the beam axis at an acute angle and that is made of a material which is capable of absorbing the remaining beam energy without vaporizing.

9. The method of claim 1 wherein the average particle transit time across said resonant cavity is at least 1.25 cycles.

10. The method of claim 1 wherein said charged-particle beam saturates the electromagnetic field in said resonant cavity.

* * * * *